(12) United States Patent
Zhu (10) Patent No.: US 7,391,733 B2
(45) Date of Patent: Jun. 24, 2008

(54) DIGITAL SERVICE HIERARCHY LEVEL 3 (DS3) APPLICATION DETECTION

(75) Inventor: Wen Zhu, Shanghai (CN)

(73) Assignee: Agere Systems Inc., Allentown, PA (US)

( * ) Notice: Subject to any disclaimer, the term of this patent is extended or adjusted under 35 U.S.C. 154(b) by 908 days.

(21) Appl. No.: 10/895,764

(22) Filed: Jul. 21, 2004

(65) Prior Publication Data

US 2006/0018346 A1    Jan. 26, 2006

(51) Int. Cl.
*H04L 1/00*    (2006.01)

(52) U.S. Cl. ...................................... 370/241

(58) Field of Classification Search .................. 370/241; 714/800, 819
See application file for complete search history.

(56) References Cited

U.S. PATENT DOCUMENTS 5,511,077 A * 4/1996 Shimada ..................... 370/505
5,596,715 A * 1/1997 Klein et al. .................... 714/43
6,839,330 B1 * 1/2005 Chitre et al. ............. 370/310.1

* cited by examiner

*Primary Examiner*—Kwang B. Yao
*Assistant Examiner*—Andrew Lai
(74) *Attorney, Agent, or Firm*—Mendelsohn & Associates, P.C.

(57) ABSTRACT

A method and apparatus for detecting the C-bit parity application of DS3 makes use of the relative state of the CP-bits and the P-bits in one or more M-frames alone or in combination with the state of the AIC signal. In one implementation, the invention is a detector circuit that is adapted to receive a CP-bit and a P-bit from each of a group of one or more M-frames of a DS3 service. For each M-frame in the group, the detector circuit performs a logical XOR between the CP-bit and the P-bit for that M-frame. The detector circuit further performs a logical OR between the XOR results from each M-frame in the group and outputs a C-bit parity format detect signal if the result is zero.

20 Claims, 5 Drawing Sheets

| Associated Subframe | Overhead Bits |
|---|---|
| M-subframe 1 | X1, F1, C1, F2, C2, F3, C3, F4 |
| M-subframe 2 | X2, F1, C1, F2, C2, F3, C3, F4 |
| M-subframe 3 | P1, F1, C1, F2, C2, F3, C3, F4 |
| M-subframe 4 | P2, F1, C1, F2, C2, F3, C3, F4 |
| M-subframe 5 | M1, F1, C1, F2, C2, F3, C3, F4 |
| M-subframe 6 | M2, F1, C1, F2, C2, F3, C3, F4 |
| M-subframe 7 | M3, F1, C1, F2, C2, F3, C3, F4 |

DIGITAL SERVICE HIERARCHY LEVEL 3 (DS3) APPLICATION DETECTION

BACKGROUND OF THE INVENTION

1. Field of the Invention

The present invention relates to telecommunications networks and, more specifically, to application identification within digital service hierarchy level 3 networks.

2. Description of the Related Art

Digital service hierarchy level 3 (DS3) is a digital, dedicated, private-line service that provides high-capacity transport for combinations of data, voice, and video applications. DS3 is a North American standard developed and standardized by the American National Standards Institute (ANSI) T1 sub-committee. Relevant specifications include "Network and Customer Installation Interfaces—DS3 Metallic Interface Specification," T1.404-2002 (herein "T1.104") and "Digital Hierarchy—Formats Specifications", T1.107-2002 (herein "T1.107"). Each specification is incorporated herein by reference in its entirety.

DS3 was initially designed to assist voice carriers in consolidating multiple, lower-speed voice connections into a single high-speed communication path between a data source and a data sink. Most carriers moved to DS3 technology in the late 1970s. Today, DS3 serves as the physical interface for a wide variety of point-to-point and site-to-site communication applications.

It should be noted that, in the literature and in this document, the terms "DSn" where n is one of {3, 2, 1, 0} will be used synonymously with the terms "Tn." However, strictly speaking, DSn is actually the contract between a carrier and an end user at a particular level n of the digital service hierarchy, the contract defining a service level and cost, while Tn is a DSn signal that is sent over terrestrial lines.

DS3 is a multiplex of lower-speed digital services (namely levels 0, 1, and 2 of the digital service hierarchy). A DS3 is typically formed by multiplexing together seven digital service hierarchy level 2 (DS2/T2) services in an M23 multiplexor. Each of these DS2 services is, in turn, formed by multiplexing together four digital service hierarchy level 1 (DS1/T1) services in an M12 multiplexor. Generally, each DS1/T1 service is formed by multiplexing together 24 DS0/T0 services. A DS0/T0 is a 64 kbps service typically used to carry a digital representation of a roughly 3 kHz analog voice signal sampled with an 8-bit companding A/D at 8 kHz.

Each frame (also known as an M-frame) of a DS3 service is composed of seven sub-frames (also known as M-sub-frames) corresponding to the seven DS2s that contribute to the DS3 multiplex. Among various overhead bits added to DS2 and DS3 frames, "stuffing" or "C-bits" are provided to deal with synchronization of the services at each level, given that the timing for the multiplexed services can potentially be based on clocks that are asynchronous to each other. There are twenty-one C-bits provided per M-frame. These are labeled $C_{ij}$ where $i \in \{1,2,3\}, j \in \{1,2,3,4,5,6,7\}$, where j corresponds to the M-subframe. So, for example, C11 (also known as application identification channel (AIC) signal) is the first C-bit of the first M-subframe and C37 is the third C-bit in the seventh M-subframe.

There are two primary applications for DS3 specified in T1-107. The first, termed M23, uses the C-bits as stuffing bits to accommodate synchronization between multiplexed streams as described above. The second, known as C-bit parity, assumes either that the incoming pseudo DS2 bit-streams are synchronous or that the DS3 is unchannelized data at 44.210 Mbit/s. In the C-bit parity case, the C-bits are not needed for stuffing purposes. They are thus utilized to improving management and performance functions. T1.107 (section 9.3.1) declares that the first C-bit in M-subframe 1 (the AIC signal) shall be set to 1 to identify the application of the DS3 service as C-bit parity. Thus, it is suggested by the standard that an endpoint (i.e., sink) for a DS3 link could use the state of this signal to detect the application; C-bit parity if the AIC signal is logical one, and M23 if the AIC signal is logical zero.

However, in an M23 application, there remains a small probability that the AIC signal will be set to logical one as alluded to in a footnote in T1.107 (section 9.3.1). This can lead to a false-positive indication of the C-bit parity application. Such a detection error might eventually be resolved, but only after delays in synchronization at the sink end of the DS3 stream.

SUMMARY OF THE INVENTION

When an M-frame uses the C-bit parity application, the C-bit parity bits of the third frame, namely C31, C32, and C33 (referred to as the CP-bits) are always set (one hundred percent of the time) to be the same as the parity (P) bits of the DS3 overhead structure. However, when an M-frame uses the M23 application, the CP-bits will only equal the P-bits approximately fifty percent of the time. Thus, by observing the relative state of the CP-bits and the P-bits, a more robust C-bit parity application detection scheme can be developed.

Thus one embodiment of the present invention is a method for detecting the C-bit parity application that is used by a DS3 service by observing the relative state of the CP- and P-bits of one or more DS3 M-frames.

Another embodiment of the present invention is a method for detecting the C-bit parity application used by a DS3 service by observing the relative state of the CP- and P-bits of one or more DS3 M-frames and also the AIC signal of one or more DS3 M-frames.

Another embodiment of the present invention is an application detection apparatus. The apparatus is adapted to receive at least CP and P-bits from one or more DS3 M-frames of a DS3 service, observe the relative logical state of the CP and P-bits, and determine the application used by the DS3 service based on these observations.

Another embodiment of the present invention is a C-bit parity application detector circuit that receives a CP-bit and a P-bit from each of a group of one or more M-frames of a DS3 service. For each M-frame in the group, the detector circuit performs a logical XOR between the CP-bit and the P-bit for that M-frame. The detector circuit further performs a logical OR between the XOR results from each M-frame in the group and outputs a C-bit parity format detect signal if the result is zero.

Another embodiment of the present invention is a method, in a communication system conforming to digital service hierarchy level 3 (DS3), for detecting that a DS3 service is operating in C-bit parity application. The method includes (1) comparing at least one CP-bit and at least one P-bit from one or more M-frames of the DS3 service, where bits C1, C2, and C3 of M-subframe 3 of each M-frame are CP-bits, and bit P1 of M-subframe 3 and bit P2 of M-subframe 4 of each M-frame are P-bits; and (2) determining that the DS3 service is operating in the C-bit parity application based on the comparison.

Another embodiment of the present invention is a method, in a communication system conforming to digital service hierarchy level 3 (DS3), for detecting that a DS3 service is operating in C-bit parity application. The method includes (1) means for comparing at least one CP-bit and at least one P-bit from one or more M-frames of the DS3 service, where bits C1, C2, and C3 of M-subframe 3 of each M-frame are CP-bits, and bit P1 of M-subframe 3 and bit P2 of M-subframe 4 of each M-frame are P-bits; and (2) means for determining that the DS3 service is operating in the C-bit parity application based on the comparison.

Another embodiment of the present invention is an apparatus for detecting that a DS3 service is operating in C-bit parity application. This apparatus operates in a communication system conforming to digital service hierarchy level 3 (DS3). The apparatus includes (1) circuitry adapted to compare at least one CP-bit and at least one P-bit from one or more M-frames of the DS3 service, wherein (i) bits C1, C2, and C3 of M-subframe 3 of each M-frame are CP-bits, and (ii) bit P1 of M-subframe 3 and bit P2 of M-subframe 4 of each M-frame are P-bits, and (2) circuitry adapted to determine that the DS3 service is operating in the C-bit parity application based on the comparison.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Introduction

Figure 1:
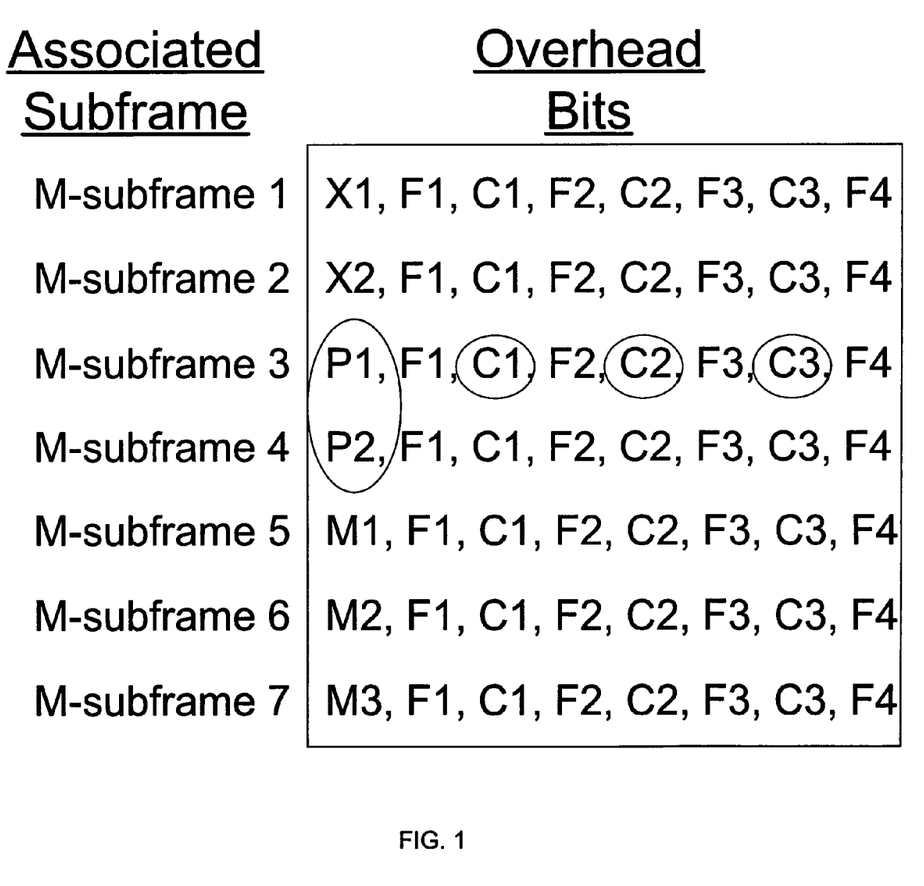
FIG. 1 illustrates the overhead bits associated with the M-subframes of an M-frame of a DS3 signal.

There are 56 frame-overhead bits in an M-frame of a DS3 signal, eight bits associated with each of seven subframes, as shown in FIG. 1. These bits are divided into channels. The channels include the M-frame alignment channel (M1, M2, and M3), the M-subframe alignment channel (F1, F2, F3, and F4), the P-bit channel (P1 and P2), the X-bit channel (X1 and X2), and the C-bit channel (C1, C2, and C3).

There are two primary applications supported by a DS3 service. These applications are M-23 and C-bit parity. Each of these applications uses the C-bit channel for different purposes.

As set forth in T1.107, section 9.1.1.5, "The C-bit channel (C1, C2, and C3) bit positions are reserved for application-specific uses settable by DS3 sources. The M23 multiplex application (see 9.2) uses the C-bits to indicate the presence or absence of stuffing bits. C-bit parity applications (see 9.3) use the C-bits to provide additional capabilities." These capabilities, as noted earlier, include improved management and performance functions.

The first C-bit of the first M-subframe of an M-frame is also known as an AIC signal. T1.107 indicates that the state of the AIC signal, in addition to "secondary" methods, can be used to determine the application in use by DS3 service. T1.107 states, section 9.1.2, "The first C-bit in M-subframe 1 shall be used as an application identification channel (AIC) signal to identify the specific DS3 M-frame application (See 9.2, 9.3, and 9.4). The M23 AIC signal is a byproduct of the stuffing control procedures of 9.2 and may be expected to carry a mixture of logical 1s and 0s. For C-bit parity applications, the C1 bit shall be set to 1." T1.107 further footnotes "The AIC signal may not be sufficient for determining identification of a C-bit parity application without confirmation by secondary methods such as the presence of zeros in the FEBE bit positions. Error rates may also impact the identification."

Also in T1.107, section 9.5.3 covering the C-bit parity application of DS3, states, "The three C-bits in M-subframe 3 are designated as CP-bits and shall be used to carry DS3-path parity information. At the DS3 network equipment transmitter, the three CP-bits shall be set to the same value as the two P-bits."

Further, T1.107, section 9.1.1.3, states, "the P-bit channel (P1 and P2) shall be used for performance monitoring and shall be set to 11 (P1=and P2=1) or 00 (P1=0 and P2=0). The P-bits bits are set according to the rules stated in 9.1.5"

Thus, in the absence of bit stream errors, within an M-frame, a CP-bit can be expected to be equal to the C-bit in a C-bit parity application one-hundred percent of the time (as long as no transmission errors are incurred). However, in an M23 application, the state of the CP-bits is based on the relationship of the clocks of the feeder streams of the DS3 M-frame.

Given the foregoing information, apparatus and methods for detecting the C-bit parity application of DS3 are provided as described in the following sections.

C-Bit Parity Detection Method

Figure 2:
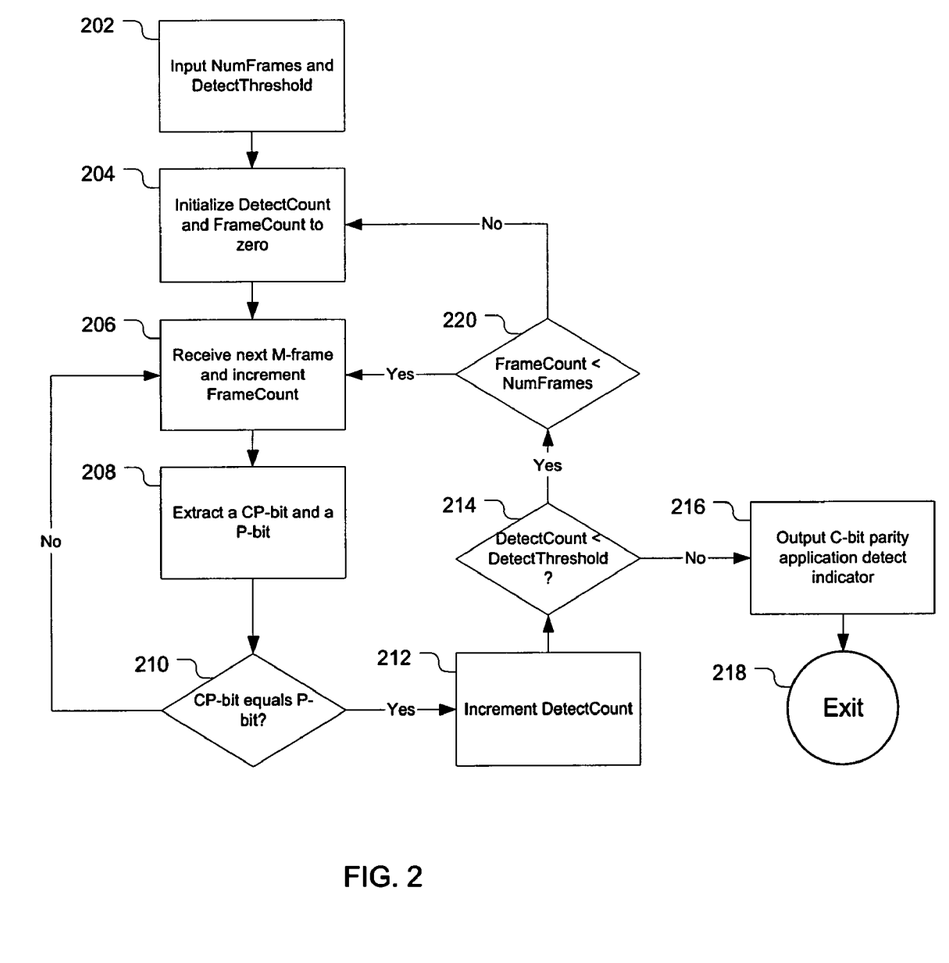
FIG. 2 illustrates a method for detecting the C-bit parity application in a DS3 service according to one embodiment of the present invention.

FIG. 2 illustrates a method for detecting the C-bit parity application in a DS3 service according to one embodiment of the present invention. In step 202 of the method, the parameters NuniFrames and DetectThreshold are input. NumFrames specifies the number of M-frames the method will consider before making a C-bit parity detection conclusion. In one embodiment NumFrames can be one. In other embodiments, NumFrames can be more than one. DetectThreshold is an integer threshold representing the minimum number of frames for which the CP-bit and P-bit must match in order for the method to conclude that the C-bit parity application is being used. Assuming error-free transmission, DetectThreshold could be set equal to NumFrames. However, given that errors may be present in received DS3 frames, DetectThreshold may sometimes be set to less than NumFrames. In step 204, the counter variables DetectCount and FrameCount are initialized to zero. Then, in step 206, the next complete M-frame is received and the FrameCount is incremented by one. In step 208, a CP-bit and a P-bit are extracted from the M-frame and, in step 210, they are compared with each other. If they fail to match, then the method loops back to step 206. However, if they match, then, in step 212, the variable DetectCount is incremented by one. In step 214, DetectCount is compared with DetectThreshold. If DetectCount is greater than or equal to DetectThreshold, then, in step 216, an indicator of C-bit parity detection is output and the method completes in step 218. If DetectCount is less than DetectThreshold, then, in step 220, FrameCount is compared with NumFrames and, if FrameCount is less, then the method loops back to step 206. If FrameCount is greater than or equal to NumFrames, then the method has failed to detect the C-bit parity application, and processing loops back to step 204 to essentially start over. Since the method has failed to detect the C-bit parity application, it is thus assumed that the system is operating in the M23 application.

As an example, if the DS3 application is M23, in step 202, parameters NumFrames and DetectThreshold are input with values of four and three respectively. In step 204, Detect-Count and FrameCount are initialized to zero. In step 206, a first DS3 M-frame is received and FrameCount is incremented to one. A CP-bit and a P-bit are extracted from the M-frame in step 208, and in step 210 the CP-bit and the P-bit are compared. If the test of step 210 fails, in step 206, the next M-frame will be received and the frame count incremented to two. A CP-bit and a P-bit will be extracted in step 208 and they will be compared in step 210. In an M23 application, a P-bit, which is a function of the data payload of the DS3 signal, is assumed to have roughly an equal probability of being either high or low, and a CP-bit, which is a function of the skew between the DS3 clock and the clocks of the DS2s from which the DS3 signal is composed, also is assumed to have an equal probability of being either high or low. Thus, in an M23 application, on the whole, there is approximately a fifty percent probability that the bits will be equal to each other for each M-frame received, so for approximately fifty percent of M-frames, the test of step 210 will fail, and for approximately fifty percent of the M-frames the test of step 210 will pass. Thus, in this example, it is assumed that the first two times the test at step 210 executes, the test fails and the method loops back to step 206. DetectCount is thus still zero. However, it is assumed that the third time the test of step 210 is run, the CP-bit is found equal to the P-bit. DetectCount is then incremented to one in step 212 and DetectCount (now one) is found to be less than DetectThreshold (three) in step 214. The method then proceeds to step 220 where FrameCount (three) is found to be less than NuniFrames (four). The method then proceeds to step 206 where another M-frame is received and FrameCount is incremented to four. A pair of CP- and P-bits are extracted from the new M-frame in step 208 and the test of step 210 again passes, DetectCount is then incremented to two in step 212, found to be less than DetectThreshold in step 214, and the method essentially restarts after the test of step 220 fails when FrameCount (four) is found to not be less than NumFrames (also four). In this case, no C-bit parity application indicator is output. It is thus assumed that the application is M23.

However, in another example, if the DS3 application is C-bit parity, given the values of parameters NumFrames and DetectThreshold of four and three, respectively, and assuming no transmission errors, the test of step 210 will pass each time it is executed. Following the third time the test of step 210 is executed, DetectCount will be incremented to three in step 212 and will be found equal to DetectThreshold in the test of step 214 and in step 216 the C-bit parity application detect indicator will be output.

C-Bit Parity Detection Apparatus

Figure 3:
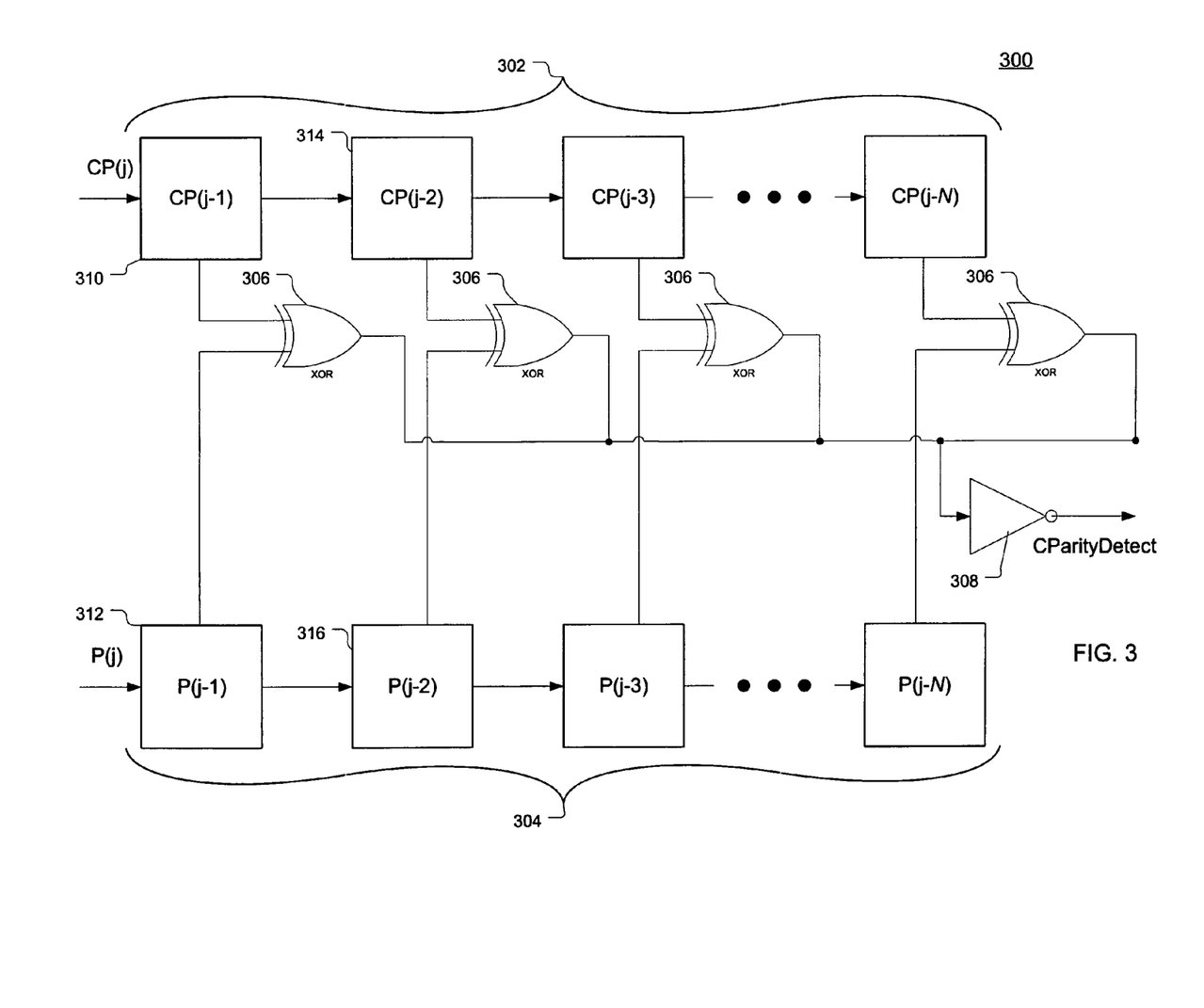
FIG. 3 illustrates a C-bit application detector circuit according to one embodiment of the present invention.

FIG. 3 illustrates a C-bit application detector circuit 300 according to one embodiment of the present invention. Circuit 300, which may be part of an integrated circuit, includes N-bit shift registers CP_SREG 302 and P_SREG 304, NXOR gates 306, and an inverter gate 308.

In operation, a CP-bit from a DS3 M-frame received at time j-N is shifted into the leftmost bit position 310 of shift register CP_SREG 302 and a P-bit from the same M-frame is shifted into the leftmost bit position 312 of shift register P_SREG 304. At the same time, the bit value that was previously held by bit position 310 of shift register CP_SREG 302 is shifted right to the next bit position 314 of that register. Similarly, the bit value that was previously held by bit position 312 of shift register P_SREG 304 is shifted right to the next bit position 316 of that register. The rest of the bits in the remaining bit positions of each of shift registers 302 and 304 are likewise shifted to the right by one bit position in agreement with the generally understood principles of operation of shift registers.

As each successive DS3 M-frame is received, a new CP-bit is shifted into CP_SREG 302 and a new P-bit is shifted into P_SREG 304. After N bits have been shifted into each register and each time thereafter that a new M-frame arrives, the values of bits of CP_SREG 302 and the P_SREG 304 are bitwise XOR'ed with each other. For example, the value of the bit stored in the leftmost bit position 310 of CP_SREG 302 is XOR'ed with the value of the bit stored in the leftmost bit position 312 of P_SREG 304, the value of the bit stored in the second to the leftmost bit position 314 of CP_SREG 302 is XOR'ed with the value of the bit stored in the second to the leftmost bit position 316 of P_SREG 304, and so on. The outputs of XOR gates 306 are wired-OR'ed together and the result is inverted by inverter gate 308 such that if all XOR outputs are logically zero, the resultant signal CParityDetect is a logic one or high or logically TRUE. Note that in one embodiment, N can be one, while in other embodiments, N can be more than one.

As an example, if the DS3 application is M23, the CP-bits and P-bits that are shifted into the shift registers 302 and 304, respectively, will not be equal to each other one hundred percent of the time. Thus, one or more of XORs 306 will output a one and the wired OR that feeds inverter 308 will be driven high. This will drive output CparityDetect of inverter 308 to zero, indicating the M23 application. However, if the DS3 application is C-bit parity, the CP-bits and P-bits that are shifted into the shift registers 302 and 304, respectively, should substantially equal to each other one hundred percent of the time (with the exception of when transmission errors occur). Thus, all XORs 306 will output a logical zero and the wired OR that is an input to inverter 308 will remain a logical zero. This will drive output CparityDetect of inverter 308 to logical one, indicating the C-bit parity application. Use of debouncing circuitry on the inverter output can minimize the effect of transmission errors on the detected state as would be understood to one skilled in the art.

With appropriate circuitry, the detector can be implemented in a way that the shift register length and hence the number N of frames considered is programmable. Similarly, the C-bit parity application could be implemented by a means of a pair of single-bit registers, one for the CP-bit and one for the P-bit, a single XOR, and a counter. Such an implementation would provide for the addition of a threshold that would allow for the toleration of erroneous bits associated with transmission errors, as discussed relative to the method embodiment of the present invention illustrated by FIG. 2. These and other variants of the implementation would be understood to one to one skilled in the art given the concept of the present invention and are thus within the scope and breadth of the present invention.

Combinations with Use of AIC

Figure 4:
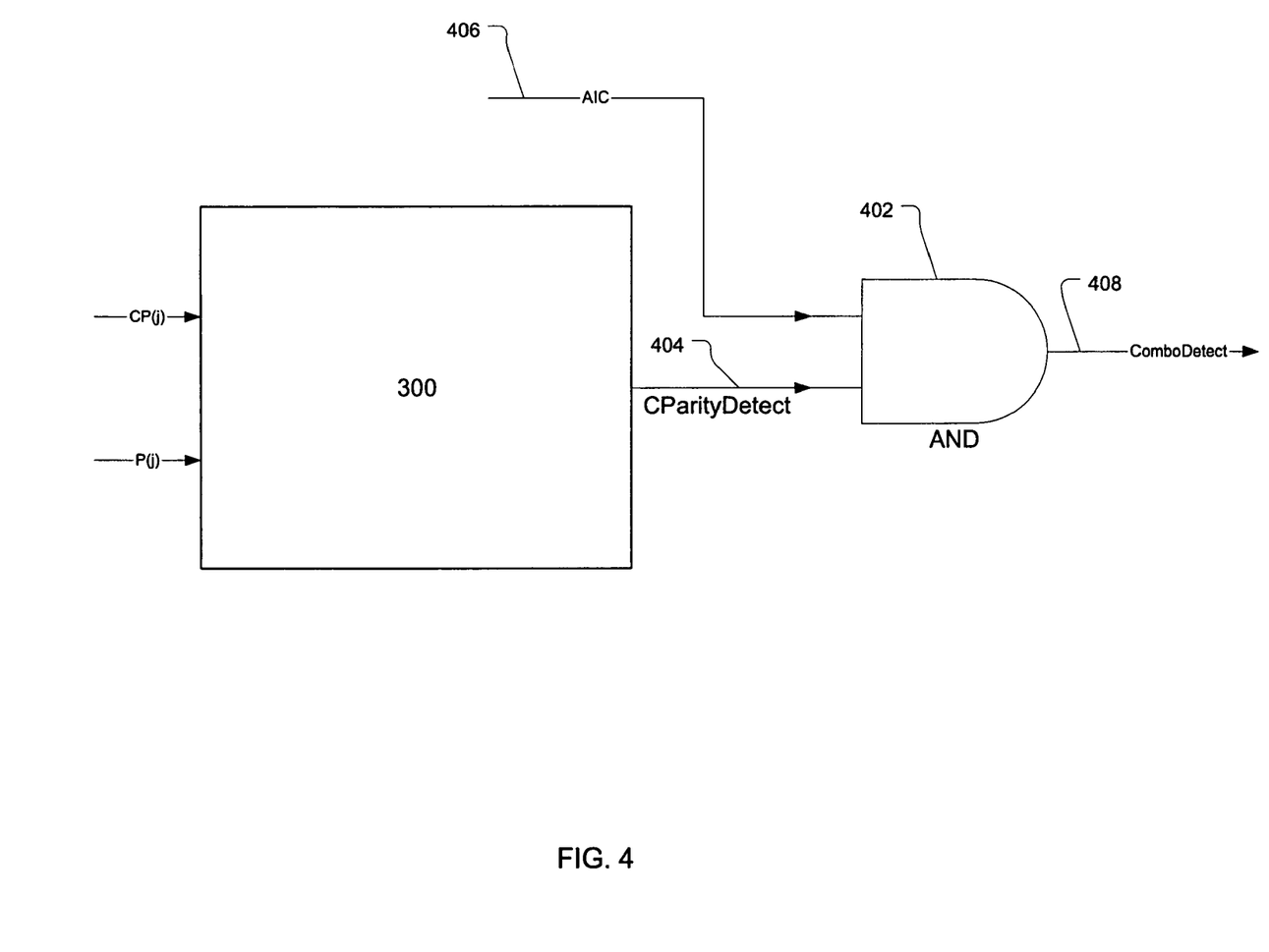
FIG. 4 illustrates a combination mode C-bit application detector circuit according to another embodiment of the present invention.

The method of FIG. 2, or the apparatus of FIG. 3, or alternative embodiments thereof that would be understood to those skilled in the art, can be combined in various ways with a method or apparatus, respectively, for detecting the C-bit parity application based on the observation of the AIC signal as recommended by T1.107 (section 9.1.2). An example of such a combined apparatus is illustrated by FIG. 4. Here, once N M-frames have been received by apparatus 300 and output CParityDetect 404 is thus valid, the output is logically AND'ed (by AND gate 402) with AIC signal 406 from the currently received M-frame (e.g., the M-frame received at time j). If the result, ComboDetect 408, is a logical one (e.g., TRUE), then it is assumed that the C-bit parity application has been detected. This combination assumes equal importance of the AIC detection basis and the CP/P detection basis. Other combinations, including those that assign different weights to the two detection bases, are within the scope and breadth of the present invention. Note that here, N can be one or more than one.

Device Implementations

The invention can be implemented in either hardware, software, or some combination of hardware and software, including but not limited to: discrete hardware logic, application specific integrated circuit, custom integrated circuits, programmable logic, programmable microprocessor-based systems, or network devices such as DS3 framers, routers, DS3 line interface units, multiplexors, demultiplexors, and mappers or other multiple-interface devices such as add/drop multiplexers, ATM switches, and other such devices which incorporate multiple interfaces including DS3. One exemplary network device is the Ultramapper from Agere Systems of Allentown, Penn.

Figure 5:
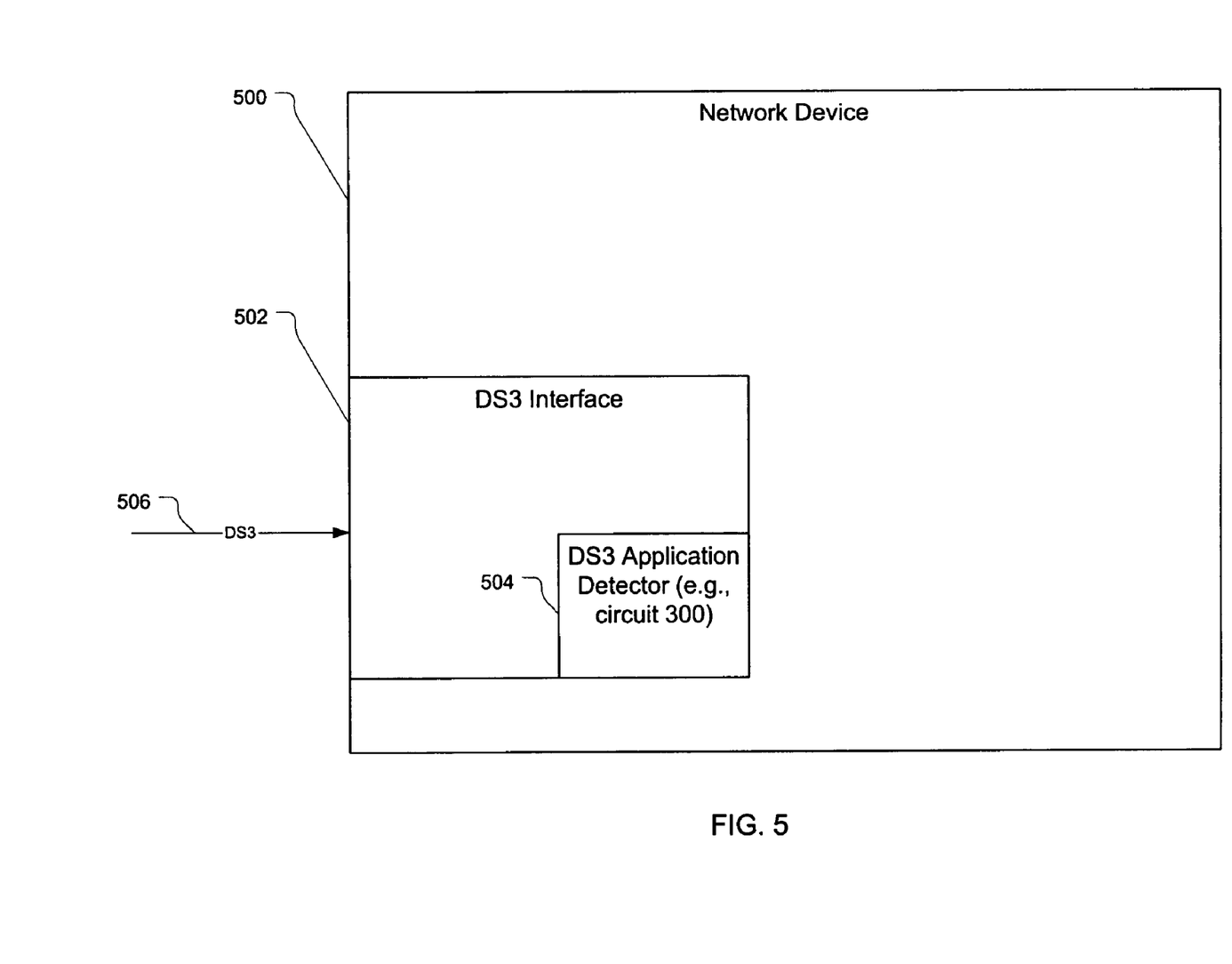
FIG. 5 illustrates an exemplary network device embodiment of the present invention.

One exemplary device embodiment of the present invention is illustrated by FIG. 5. Here network device 500 includes DS3 interface circuitry 502 that includes a DS3 application detector 504 (e.g., detector circuitry 300 of FIG. 3). In operation, DS3 signal 506 is received by network device 500 via DS3 interface 502. Appropriate overhead bits of one or more frames of the DS3 signal are passed by DS3 interface 502 to DS3 application detector 504 for determination of the application used by the incoming DS3 signal. This information is used by the interface to help it properly interpret the bits received as part of the DS3 and properly recover the data payload from the DS3 signal. The data payload is ultimately delivered to network device 500, which may include a network protocol stack (e.g., TCP/IP) and other applications that make use of the data.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method for detecting that a digital service hierarchy level 3 (DS3) service is operating in C-bit parity application, the method comprising:

comparing at least one CP-bit and at least one P-bit from one or more M-frames of the DS3 service, wherein:
bits C1, C2, and C3 of M-subframe 3 of each M-frame are defined as CP-bits; and
bit P1 of M-subframe 3 and bit P2 of M-subframe 4 of each M-frame are defined as P-bits; and
determining that the DS3 service is operating in the C-bit parity application based on the comparison.

2. The invention of claim 1, further comprising observing the state of the application identification channel (AIC) signal in at least one of the one or more M-frames, wherein bit C1 of M-subframe 1 of each M-frame is the AIC signal and the determination is further based on the observed AIC-signal state.

3. The invention of claim 1, wherein the comparing step compares at least one CP-bit and at least one P-bit from N M-frames of the DS3 service, N being greater than 1.

4. The invention of claim 3, wherein the DS3 service is determined to be operating in the C-bit parity application when the at least one CP-bit matches the at least one P-bit in a specified number of the M-frames, where the specified number is less than or equal to N.

5. The invention of claim 4, wherein the specified number is less than N.

6. The invention of claim 3, further comprising observing the logic state of the AIC signal in at least one of the one or more M-frames, wherein bit C1 of M-subframe 1 of each M-frame is the AIC signal and the determination is further based on the observed logic state of the AIC signal.

7. An apparatus for detecting that a digital service hierarchy level 3 (DS3) service is operating in C-bit parity application, the apparatus comprising:

means for comparing at least one CP-bit and at least one P-bit from one or more M-frames of the DS3 service, wherein:
bits C1, C2, and C3 of M-subframe 3 of each M-frame are defined as CP-bits; and
bit P1 of M-subframe 3 and bit P2 of M-subframe 4 of each M-frame are defined as P-bits; and
means for determining that the DS3 service is operating in the C-bit parity application based on the comparison.

8. The invention of claim 7, further comprising means for observing the logic state of the AIC signal in at least one of the one or more M-frames, wherein bit C1 of M-subframe 1 of each M-frame is the AIC signal and the determination is further based on the observed logic state of the AIC signal.

9. The invention of claim 7, wherein the at least one CP-bit and at least one P-bit from N M-frames of the DS3 service are compared, N being greater than 1.

10. The invention of claim 9, wherein the DS3 service is determined to be operating in the C-bit parity application when the at least one CP-bit matches the at least one P-bit in a specified number of the M-frames, where the specified number is less than or equal to N.

11. The invention of claim 10, wherein the specified number is less than N.

12. The invention of claim 9, further comprising means for observing the logic state of the AIC signal in at least one of the one or more M-frames, wherein bit C1 of M-subframe 1 of each M-frame is the AIC signal and the determination is further based on the observed logic state of the AIC signal.

13. An apparatus for detecting that a digital service hierarchy level 3 (DS3) service is operating in C-bit parity application, the apparatus comprising:

circuitry adapted to compare at least one CP-bit and at least one P-bit from one or more M-frames of the DS3 service, wherein:
bits C1, C2, and C3 of M-subframe 3 of each M-frame are defined as CP-bits; and
bit P1 of M-subframe 3 and bit P2 of M-subframe 4 of each M-frame are defined as P-bits; and
circuitry adapted to determine that the DS3 service is operating in the C-bit parity application based on the comparison.

14. The invention of claim 13, further comprising circuitry adapted to observe the logic state of the AIC signal in at least one of the one or more M-frames, wherein bit C1 of M-subframe 1 of each M-frame is the AIC signal and the determination is further based on the observed logic state of the AIC signal.

15. The invention of claim 13, wherein at least one CP-bit and at least one P-bit from N M-frames of the DS3 service are compared, N being greater than 1.

16. The invention of claim 15, wherein the DS3 service is determined to be operating in the C-bit parity application when the at least one CP-bit matches the at least one P-bit in a specified number of the M-frames, where the specified number is less than or equal to N.

17. The invention of claim 16, wherein the specified number is less than N.

18. The invention of claim 15, further comprising circuitry adapted to observe the logic state of the AIC signal in at least one of the one or more M-frames, wherein bit C1 of M-subframe 1 of each M-frame is the AIC signal and the determination is further based on the observed logic state of the AIC signal.

19. The invention of claim 13, wherein the apparatus is an integrated circuit.

20. The invention of claim 13, wherein the apparatus is a device selected from the group: network device, framer, server, router, mapper, multiplexor, demultiplexor, and line-interface unit.

* * * * *